United States Patent
Prasad et al.

(10) Patent No.: US 6,916,362 B2
(45) Date of Patent: Jul. 12, 2005

(54) ION TRANSPORT MEMBRANE ISOLATION DEVICE

(75) Inventors: Ravi Prasad, East Amherst, NY (US); James Eric White, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/429,890

(22) Filed: May 6, 2003

(65) Prior Publication Data

US 2004/0221722 A1 Nov. 11, 2004

(51) Int. Cl.⁷ .......................... B01D 53/22; B01D 35/00
(52) U.S. Cl. .................. 96/10; 96/8; 96/400; 96/402
(58) Field of Search .................. 55/418, 523; 96/4, 96/8, 10, 399, 400, 402

(56) References Cited

U.S. PATENT DOCUMENTS

| | | | | |
|---|---|---|---|---|
| 4,356,007 A | * | 10/1982 | Bowman | 96/399 |
| 4,808,199 A | * | 2/1989 | Yearout | 95/49 |
| 4,859,331 A | * | 8/1989 | Sachtler et al. | 210/321.8 |
| 4,986,837 A | * | 1/1991 | Shibata | 96/6 |
| 5,160,514 A | * | 11/1992 | Newbold et al. | 96/8 |
| 5,503,661 A | * | 4/1996 | Brannstrom | 95/273 |
| 5,820,655 A | * | 10/1998 | Gottzmann et al. | 95/54 |
| 6,004,383 A | * | 12/1999 | Kuhnelt | 96/8 |
| 6,168,650 B1 | * | 1/2001 | Buxbaum | 95/55 |
| 6,293,084 B1 | * | 9/2001 | Drnevich et al. | 60/783 |
| 6,370,887 B1 | * | 4/2002 | Hachimaki | 62/94 |
| 2003/0047077 A1 | * | 3/2003 | Giglia et al. | 96/8 |

* cited by examiner

*Primary Examiner*—Robert H. Spitzer
(74) *Attorney, Agent, or Firm*—David M. Rosenblum

(57) ABSTRACT

An isolation device for one or more ion transport membranes and that has a housing and one or more check valves in communication with one or more passageways extending through the housing to prevent gas flow within the housing and the ion transport membrane(s) upon breakage thereof. Where a lance tube is used with the oxygen transport membrane a second check valve can be used. The check valves, preferably contain spring loaded poppet valves which, though normally open, are capable of resetting themselves into a closed position upon breakage or other failure of the oxygen transport membrane tubes.

6 Claims, 1 Drawing Sheet

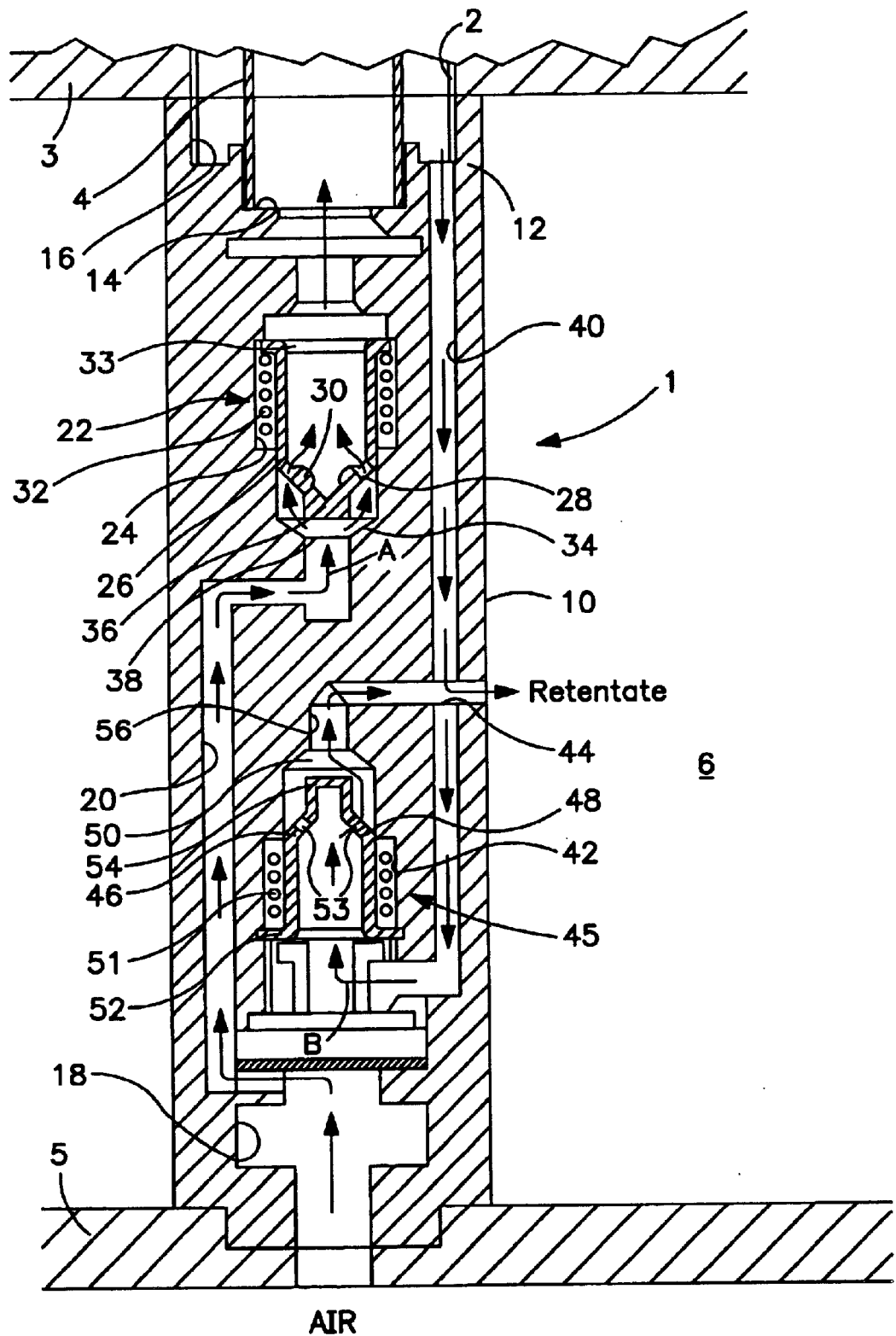

ION TRANSPORT MEMBRANE ISOLATION DEVICE

FIELD OF THE INVENTION

The present invention relates to an isolation device for an ion transport membrane that projects into a reactor to isolate the ion transport membrane. More particularly, the present invention relates to such an isolation device connected to the ion transport membrane in which one or more check valves, located in a housing, prevent flow of pressurized gas either to or from the membrane upon failure of the ion transport membrane.

BACKGROUND OF THE INVENTION

Oxygen transport membrane elements are used within reactors for gas separation and in the production of synthesis gas. They are manufactured from ceramic materials that conduct oxygen ions at elevated temperatures. On one surface of the membrane, known as the cathode side, oxygen in an oxygen containing feed ionizes by gaining electrons. The oxygen ions are transported through the membrane to an anode side in which the oxygen ions lose electrons and reconstitute into elemental oxygen.

The electrons, in case of an oxygen transport membrane formed by what is known as a mixed conducting material, are transported through the membrane from the anode side to the cathode side to ionize the oxygen. In other materials known as ionic conductors, the material is capable of conducting oxygen ions only and as such, electrodes and a separate electrical pathway are provided to conduct the electrons.

The separation of the oxygen from the oxygen containing feed can be driven by a partial pressure differential of oxygen between the cathode and anode sides of the oxygen transport membrane. Oxygen transport membranes can be used in reactors that are designed to separate oxygen. In such reactors, a pressurized process gas, for instance, air contacts the cathode side of the membrane to create the oxygen partial pressure differential between the cathode and anode side of the membrane. The partial pressure differential can also be created or enhanced with the use of a sweep gas, for instance, steam, that can be introduced to the anode side of the membrane to sweep away permeated oxygen and thereby lower the partial pressure differential on the anode side of the membrane.

In situations in which a sweep gas is used, the membrane can be a tubular membrane, closed at one end, with lance tubes projecting into the membrane. The oxygen containing feed gas, under pressure is introduced to the outer cathode side of the membrane and a sweep gas such as steam is introduced into the interior, anode side of the membrane to "sweep" away the permeated oxygen. Alternatively, the oxygen containing gas can be introduced into the inside of the membrane with or without the use of a lance tube and a reactant gas can be consumed on the anode side of the membrane to lower the oxygen partial pressure.

Oxygen transport membranes can be used to support reactions such as synthesis gas reactions. In such reactions, a fuel is reacted with the oxygen containing gas over a suitable catalyst provided at the anode side of the membrane to produce a hydrogen and carbon monoxide containing synthesis gas mixture. In such an application, the oxygen transport membrane is not only operated at elevated temperature, for instance near 1000° C. but also, separates a high pressure reacting gas, such as methane at 200 psig, from a lower pressure oxidant gas, such as air at 20 psig. These extreme operating conditions can result in premature failure of the oxygen transport membrane. Moreover, the failure itself can be catastrophic due to the brittle nature of the ceramic mixed conducting material, for instance, a perovskite or pseudo-perovskite.

In many reactor designs, the oxygen transport membranes are in the form of known closed end tubes. The tubes are attached to tubesheets such as illustrated in U.S. Pat. No. 5,820,655. Upon failure of the oxygen transport membrane, the higher pressure process gas will mix with the lower pressure process gas. In case of synthesis gas production, as described above, the processes gases can be a high pressure fuel stream, that upon failure of the oxygen transport membrane, can then mix with an oxygen containing feed with potentially catastrophic results. Therefore, upon failure of a membrane element, the reactor must be shut down and the failed oxygen transport membrane element must be replaced. This is a time consuming process that makes the use of such reactors unattractive.

As will be discussed, the present invention provides an isolation device for isolating a broken oxygen transport membrane element to avoid the need of immediate replacement.

SUMMARY OF THE INVENTION

The present invention provides an isolation device for at least one ion transport membrane projecting into a reactor to prevent flow through the ion transport membrane upon breakage thereof and thereby isolate the at least one ion transport membrane. The isolation device has a housing having at least one passageway in communication with the at least one ion transport membrane such that a process gas flowing inside of the at least one ion transport membrane passes through the at least one passageway. At least one check valve communicates with the at least one passageway and is configured to prevent flow of the process gas through the at least one passageway upon breakage of the at least one ion transport membrane.

The term "at least one" is used with respect to the ion transport membrane in that it is understood that the present invention has application not only for use in connection with a single ion transport membrane but also ion transport membranes that are manifolded together. As may be appreciated, the process gas can be oxygen that flows from the membrane and through the at least one passageway to be collected. The oxygen is separated from a pressurized oxygen containing gas, such as air that contacts the outside of the membrane. Upon breakage of the ion transport membrane, the check valve closes to seal the passageway and thereby isolate the ion transport membrane. Alternatively, the process gas can be air that is introduced on the inside of the membrane and the check valve closes to seal the passageway to prevent the air from entering the membrane. Alternatively, where the process gas is air flowing inside the membrane, a high pressure reactive stream can be provided to contact the outside of the ion transport membrane. In such case, the check valve would be set in the opposite flow direction to cut off the flow of such process gas upon breakage of the ion transport membrane. Once flow is cut off, the ion transport membrane is isolated from other ion transport membranes and a reactor housing the ion transport membrane is able to remain in an operational condition without requiring immediate replacement of the broken ion transport membrane.

The present invention is not restricted in its applicability to any particular form of an ion transport membrane. The ion transport membrane may be in the form of flat ceramic plates or may be a tubular form of an ion transport membrane that is open at both ends or closed at one end. In case of a tube open at both ends, for instance, air could be introduced into one end of the tube and the retentate would flow out the other end of the tube. In such case, two isolation devices would have to be used.

The at least one ion transport membrane can be a tubular membrane having a closed end. A lance tube is coaxially positioned within the ion transport membrane to project through the open end thereof. The at least one passageway comprises at least one first passageway and at least one second passageway and the at least one check valve comprises first and second check valves. The first passageway is in communication with said lance tube and the first check valve and the second passage is in communication with an annular space defined between the open end of the ion transport membrane and the lance tube and said second check valve. Thus, air could be introduced into the first passageway and the lance tube and a retentate would flow through the annular space and out of the second passageway. A pressurized reactant gas such as methane could contact the outside of the oxygen transport membrane to produce a synthesis gas. In such a situation the first and second check valves would isolate the oxygen transport membrane upon breakage thereof. Among many other possibilities for the use of the present invention, a pressurized oxygen containing gas could contact the outside of the oxygen transport membrane and steam could be introduced into the inside of the membrane to carry away permeated oxygen. In both of the aforementioned cases, the ion transport membrane projects into a pressurized reactor and the gas flow comprises hot pressurized gas within the pressurized reactor. The first and second check valves are set to prevent back flow of the gas flow from the lance tube and into the first passageway and the annular space into the second passageway, respectively.

In applications of the present invention having two passageways and two check valves, the housing can be elongated and the first and second check valves are coaxially positioned with respect to one another as opposed to a wider side-by-side configuration.

Each of said first and second check valves can be provided with a valve cavity defined in the housing and having a conical valve seat defining an opening to the valve cavity. A poppet valve of cup-like configuration is provided. The poppet valve has a conical sealing surface configured to seat against said conical valve seat and a plurality of apertures defined in said conical sealing surface. The apertures are sized such that the gas flow chokes within the apertures to urge said poppet valve, against a force produced by spring compression, into a closed position sealing off the apertures and the valve cavity. A spring is located within the valve cavity to urge said poppet valve into a normally open position and thereby produce the spring compression.

Preferably, the poppet valve is provided with a nose section configured to project into the opening, thereby to center said poppet valve and the conical sealing surface with respect to said valve seat upon valve closure.

BRIEF DESCRIPTION OF THE DRAWINGS

While the specification concludes with claims distinctly pointing out the subject matter that Applicants regard as their invention, it is believed that the invention will be better understood when taken in connection with the accompanying sole FIGURE which is a schematic, sectional view of an Isolation Device in accordance with the present invention.

DETAILED DESCRIPTION

With reference to the FIGURE an isolation device 1 in accordance with the present invention is illustrated.

Oxygen transport membranes such as oxygen transport membrane 2 is connected to a tubesheet 3 of a reactor in any one of a variety of known methods. A lance tube 4 is coaxially positioned within oxygen transport membrane 2 to introduce air into the oxygen transport membrane. The air circulates back towards tubesheet 3. During such circulation, oxygen separates from the air flowing within oxygen transport membrane 2. Although not illustrated, a fuel and a catalyst could be provided on the opposite side of oxygen transport membrane 2 and the opposite side of tubesheet 3 for production of a chemical such as syngas. Although not illustrated, oxygen transport membrane 2 is of closed end configuration.

Isolation device 1 has a housing 10 that bridges tubesheet 3 and an opposite tubesheet 5. A chamber 6 is defined between tubesheets 3 and 5 to collect a retentate stream. Housing 10 is connected at opposite ends to tubesheet 3 and tubesheet 5 by such means as welding. Housing 10 is also provided with a recessed end portion 12 having concentric inner and outer bores 14 and 16. Lance tube 4 projects through tubesheet 3 and seats within inner bore 14 and can be connected to housing 10 within bore 14 by such means as welding. Oxygen transport membrane 2 also projects through tubesheet 3 and projects into outer bore 16 in a tight fitting relationship. Oxygen transport membrane 2 is held in place by connection to the tubesheet 3 in any one of a variety of known techniques.

The incoming air enters a vestibule 18 and then flows through a first passageway 20 to inner bore 14 and therefore lance tube 4. A first check valve 22 having a first check valve cavity 24 is provided for containing the check valve which in the illustrated embodiment is a poppet valve 26 of cup-like configuration having a conical sealing surface 28 and apertures 30.

The air enters check valve cavity 24 and flows through apertures 30. Thereafter the air flows into inner bore 14 and lance tube 4. Check valve 22 is biased in the open position by way of a spring 32 bearing against an annular lip 33 of poppet valve 26 to urge poppet valve 26 in an open position.

Upon breakage of oxygen transport membrane 2, pressurized gas flows opposite to the flow direction "A" of incoming air. The apertures 30 are sized such that they tend to choke, thus forcing poppet valve 26 into a closed position with a conical sealing surface 28 thereof seated against a conical valve seat 34 defined within valve chamber 24 to close off openings 30 and therefore the flow within first passageway.

As illustrated, poppet valve 26 has a nose section 36 that will extend into an opening 38 defined by the inner edge of conical valve seat 34 when in the closed position. This helps to center poppet valve 26 and therefore the conical sealing surface 28 with respect to conical valve seat 34.

The oxygen depleted air or retentate flows through a return passageway 40 in a direction indicated by arrowhead "B". Passageway 40 is in communication with an annular space formed between lance tube 4 and oxygen transport membrane 2 to receive the retentate. The retentate then flows through a valve cavity 42 to an outlet passage 44 and into chamber 6.

Valve cavity 42 contains a valve assembly 45 consisting of a poppet valve 46 having a sealing surface 48 configured to seat and seal against a valve seat 50 formed within valve chamber 42. Poppet valve 46 is biased in the open position by way of a spring 51 bearing against an outer annular lip 52 of poppet valve 46. Upon breakage of oxygen transport membrane 2, flow in a direction opposite to arrowhead "B" will choke within openings 53 defined in sealing surface 48. The overpressure will force poppet valve 46 into its closed position in which conical sealing surface 48 is forced against valve seat 50. Poppet valve 46 is provided with a nose section 54 configured to extend into a centering opening 56 defined by the inner edge of valve seat 50 when poppet valve 46 is urged by pressure into its closed position.

As may be appreciated, a plurality of return passageways 40 could be provided as well as inlet passageways 20 and outlet passageways 44 to handle the flow. Although not illustrated, in an application in which there was an oxygen transport membrane without a lance tube, only a single check valve assembly might be used. Advantageously, check valve assemblies 22 and 45 are coaxially positioned. It is possible to position them in a less preferred, wider housing, side by side. This, however, would result in a thicker housing 10 which would take up more space.

Housing 10 can be manufactured from a high temperature metal capable of withstanding the environment of temperature which can be between about 500° and 1000° C. and any special chemical environment in which oxygen transport membrane 2 is employed. Spring 32 and spring 51 can be fabricated of a metal such that structural stability is maintained and premature shut-off is prevented. HAYNES 230 alloy is a suitable material. Another possibility is the use of a resilient ceramic felt.

As may further be appreciated, in applications of the present invention in which the pressurized gas flows into the oxygen transport membrane check valves such as those illustrated above would be set in an opposite orientation to close upon overpressures acting in the direction of arrowheads "A" and "B".

As will occur to those skilled in the art, numerous additions, omissions and changes can be made without departing from the spirit and scope of the present invention.

We claim:

1. An isolation device for at least one ion transport membrane projecting into a reactor to prevent flow through said at least one ion transport membrane upon breakage thereof and thereby isolate said at least one ion transport membrane, said isolation device comprising:
   a housing having at least one passageway in communication with said at least one ion transport membrane such that a process gas flowing inside of said at least one ion transport membrane passes through said at least one passageway; and
   at least one check valve in communication with said at least one passageway configured to prevent gas flow through said at least one passageway upon breakage of said at least one ion transport membrane.

2. The isolation device of claim 1, wherein:
   said at least one oxygen transport membrane is an ion transport membrane of tubular configuration and has a closed end opposite to an open end;
   a lance tube is coaxially positioned within the ion transport membrane and projects through the open end thereof;
   said at least one passageway comprises at least one first passageway and at least one second passageway;
   said at least one check valve comprises first and second check valves; and
   said first passageway is in communication with said lance tube and said first check valve and said second passage is in communication with an annular space defined between said open end of said ion transport membrane and said lance tube and said second check valve.

3. The isolation device of claim 2, wherein:
   said ion transport membrane projects into a pressurized reactor and said gas flow comprises hot pressurized gas within said pressurized reactor; and
   said first and second check valves are set to prevent back flow of said gas flow from said lance tube and into said first passageway and said annular space into said second passageway, respectively.

4. The isolation device of claim 3, wherein each of said first and check valves includes:
   a valve cavity defined in said housing and having a conical valve seat defining an opening to said valve cavity;
   a poppet valve of cup-like configuration and having a conical sealing surface configured to seat against said conical valve seat and a plurality of apertures defined in said conical sealing surface, the apertures sized such that the gas flow chokes within said apertures to urge said poppet valve, against a force produced by spring compression, into a closed position sealing off said apertures and the valve cavity; and
   a spring located within said valve cavity to urge said poppet valve into a normally open position and thereby produce said spring compression.

5. The isolation device of claim 4, wherein said poppet valve has a nose section configured to project into said opening, thereby to center said poppet valve and said conical sealing surface with respect to said valve seat upon valve closure.

6. The isolation device of claim 2, wherein said housing is elongated and said first and second check valves are coaxially positioned with respect to one another.

* * * * *